United States Patent
Arlitt et al.

(10) Patent No.: US 11,374,972 B2
(45) Date of Patent: Jun. 28, 2022

(54) DISINFORMATION ECOSYSTEM FOR CYBER THREAT INTELLIGENCE COLLECTION

(71) Applicant: MICRO FOCUS LLC, Santa Clara, CA (US)

(72) Inventors: Martin Arlitt, Calgary (CA); Pratyusa Manadhata, Sacramento, CA (US)

(73) Assignee: Micro Focus LLC, Santa Clara, CA (US)

( * ) Notice: Subject to any disclaimer, the term of this patent is extended or adjusted under 35 U.S.C. 154(b) by 248 days.

(21) Appl. No.: 16/546,529

(22) Filed: Aug. 21, 2019

(65) Prior Publication Data

US 2021/0058428 A1    Feb. 25, 2021

(51) Int. Cl.
*H04L 29/06*    (2006.01)
*H04L 9/40*    (2022.01)

(52) U.S. Cl.
CPC ........ *H04L 63/1491* (2013.01); *H04L 63/145* (2013.01); *H04L 63/1416* (2013.01); *H04L 63/1425* (2013.01); *H04L 63/1433* (2013.01); *H04L 63/1483* (2013.01)

(58) Field of Classification Search
CPC .............. H04L 63/1425; H04L 63/101; H04L 63/1433; H04L 63/1491; H04L 63/1416; H04L 63/145; H04L 63/1483
See application file for complete search history.

(56) References Cited

U.S. PATENT DOCUMENTS

| | | | |
|---|---|---|---|
| 8,856,928 B1 | 10/2014 | Rivner et al. | |
| 9,392,001 B2 | 7/2016 | Wang et al. | |
| 10,069,854 B2 | 9/2018 | Bogg et al. | |
| 10,601,864 B1 * | 3/2020 | Nanda | H04L 63/1466 |
| 10,637,864 B2 * | 4/2020 | Ohayon | H04L 63/1416 |
| 2015/0326608 A1 * | 11/2015 | Shabtai | H04L 63/1425 726/23 |
| 2017/0244736 A1 | 8/2017 | Benishti | |
| 2019/0007451 A1 * | 1/2019 | Pierce | H04L 63/1425 |
| 2020/0053121 A1 * | 2/2020 | Wilcox | G06N 3/08 |

FOREIGN PATENT DOCUMENTS

WO    WO2017131963 A1    8/2017

OTHER PUBLICATIONS

H. Haddadi and P. Hui, "To Add or Not to Add: Privacy and Social Honeypots," 2010 IEEE International Conference on Communications Workshops, 2010, pp. 1-5, doi: 10.1109/ICCW.2010.5503929. (Year: 2010).*

(Continued)

*Primary Examiner* — Fatoumata Traore
*Assistant Examiner* — Thomas A Gyorfi

(57) ABSTRACT

Techniques and apparatuses are described to enable a strategically coordinated fictitious ecosystem of disinformation for cyber threat intelligence collection in a computing network. The ecosystem comprises fictitious profiles and supporting fictitious infrastructure information to portray in-depth, apparent authenticity of the ecosystem. Malicious communications from an adversary directed at the ecosystem are monitored, and threat intelligence about the adversary is collected to prevent future attacks.

20 Claims, 4 Drawing Sheets

(56) References Cited

OTHER PUBLICATIONS

A. Paradise et al., "Creation and Management of Social Network Honeypots for Detecting Targeted Cyber Attacks," in IEEE Transactions on Computational Social Systems, vol. 4, No. 3, pp. 65-79, Sep. 2017, doi: 10.1109/TCSS.2017.2719705. (Year: 2017).*
Detecting Advanced Persistent Threats through Deception Techniques; Nikolaos Virvilis-Kollitiris; 174 pages; Oct. 2015.
Honeypots Lure Industrial Hackers into the Open; Tom Simonite; 23 pages; May 8, 2013.
Honeypot (computing); Wikipedia; 7 pages; May 2019.

* cited by examiner

DISINFORMATION ECOSYSTEM FOR CYBER THREAT INTELLIGENCE COLLECTION

BACKGROUND

High-level executives, such as CxO's (e.g., C-level corporate executives whose roles often start with "Chief" and end with "Officer") or other individuals who have access to sensitive business information, are under constant and sophisticated cyber-attacks from many different entities, attackers, or adversaries. The threats typically target these high-value targets through computer communication and information systems, and come in many different forms. Phishing, spear phishing, and whaling are common high-level categories of threats faced by high-value targets (phishing generally being a broader, more generic effort to deceive a wide net of many individuals; spear phishing being targeted to a particular individual; and whaling being directed at a high-value target, e.g., CxO).

In particular, an adversary uses fake information and social engineering to dupe potential targets, and especially high-value targets. In turn, the target divulges confidential or high-value information to the adversary. For example, the adversary may obtain the target's authentication credentials via a spear phishing email, malware attachment, or malware link, and then steal sensitive confidential information, financial information, or customer information. Increasingly, once the target is duped, the adversary may even indulge in wire transfer fraud to steal money from the business. In another variation, the adversary may pose as the CxO and may convince the CxO's assistant to initiate a wire transfer to the adversary's account. The fraudulent efforts and activities are numerous in variety and types.

Detecting and combating such cyber threats is increasingly a high-stakes priority for many business entities. In this context, it is not uncommon for businesses to take specific efforts to manage or configure their computing, networking, and information systems to minimize or prohibit such attacks. Additionally, employees may be trained to recognize certain potential cyber threats in order to avoid succumbing to deceptive attacks.

DETAILED DESCRIPTION

Figure 1:
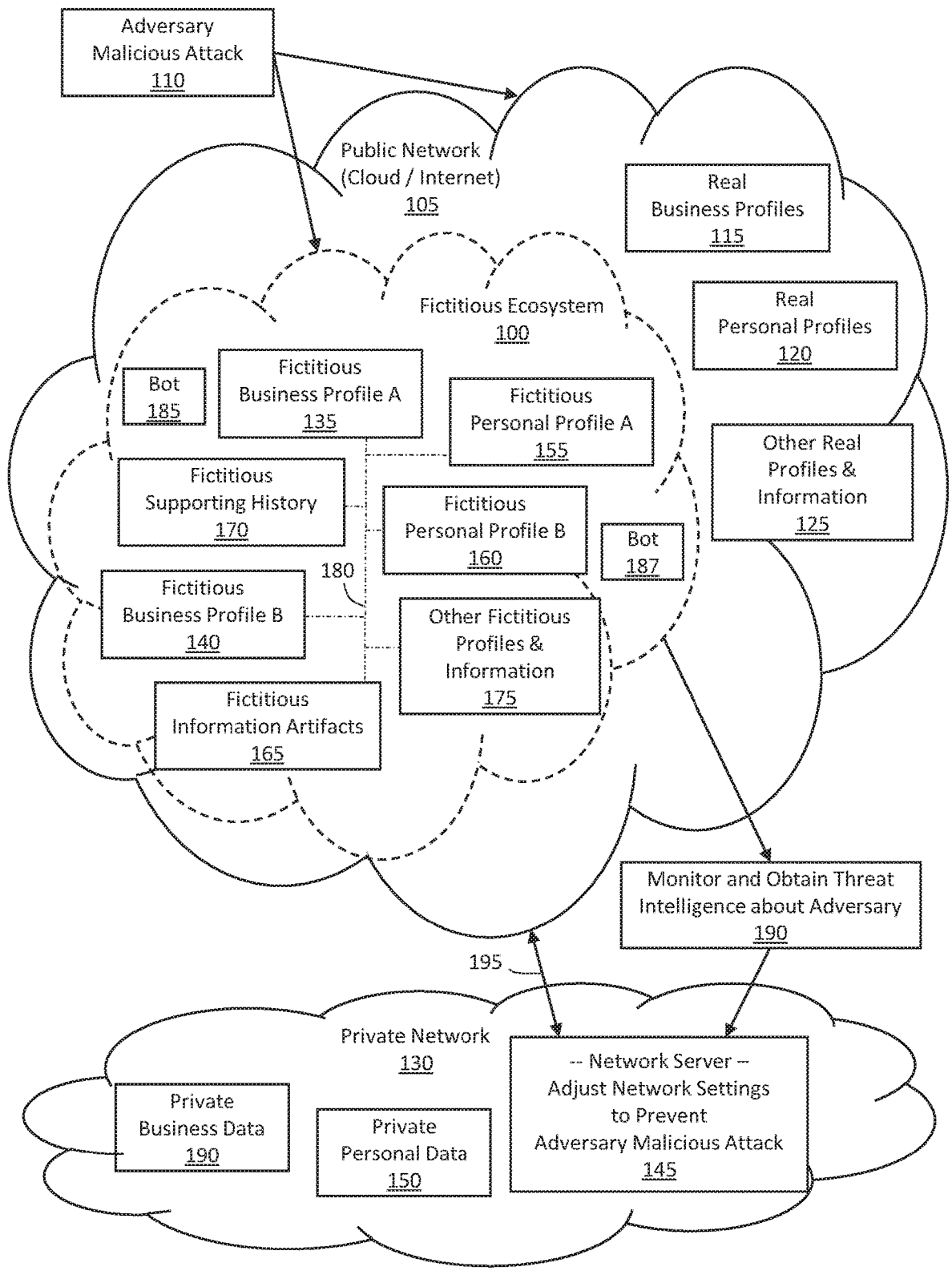
FIG. 1 is a block diagram illustrating an example of a strategically coordinated fictitious ecosystem of disinformation for managing cyber threats.

FIG. 1 is a block diagram illustrating an example strategically coordinated fictitious ecosystem of disinformation 100 structured (or generated) for luring, detecting, and managing cyber threats (e.g., malicious communications) within a public computing network or environment 105 (e.g., the Internet or a cloud environment), as hosted by one or more computers, computer servers, server farms, cloud services, etc. This ecosystem 100 enables the identification and collection of cyber threat intelligence of a party's (e.g., an adversary's) malicious attack activities 110 before they hit a real target 115, 120, 125, 130, in order to prevent the adversary from fraudulently obtaining information from the real target. The ecosystem presents a disinformation campaign that includes strategically (e.g., purposefully or tightly) coordinated workings 180 of fictitious information in the computing environment to portray in-depth, apparent authenticity of the ecosystem to a potential adversary and to obtain threat intelligence from the adversary. As adversaries use fake information to dupe their targets and obtain high value information from them, this approach feeds disinformation to adversaries without their knowledge and tricks them into disclosing their modus operandi and working configurations.

This system and method create fake (fictitious) profiles 135, 140, 155, 160 depicting enticing targets, such as high-value targets, and lures the adversary into interacting with these fake profiles. These profiles may comprise web pages depicting a fictitious business entity or person, their existence, purpose, goods and/or services, marketing or advertising components, certain personnel or executive leadership information, and/or any other information commonly found on business or personal web pages or other profiles. Additionally, the profiles may comprise social media—profiles, accounts and/or postings, such as LinkedIn, Instagram, Facebook, and Twitter.

The adversary contacts the fake profiles and targets them for phishing, spear phishing, whaling, attempted malware injection, and/or other malicious attacks and communications. All communications (e.g., emails, messaging communications, and embedded URL links) reaching the fake profiles are monitored and analyzed 190, by a processor programmed with instructions, to learn about the adversary's behavior and resources, such as identifying an email address, IP address, domain, mail server, web server hosting the spear phishing links, and/or the like. The collected information, or threat intelligence, may then be provided to and be used by security analysts to monitor and protect real targets 115, 120, 125 and private network(s) 130. For example, a private network 130 may configure its enterprise communications server 145 to block, via gateway 195, any malicious communications (e.g., email, messaging, chat, VOIP) from the adversary's malicious attack 110 communications server that are addressed to the CxO and other executives or individuals 150 of the private network 130, and may configure the enterprise's web proxy server to block HTTP and HTTPS requests to the adversary's web server associated with the malicious attack 110. As another example, in some circumstances all network communications via any application protocol could be selectively blocked. This protects not only the private personal data 150, but also the private business data 190. In FIG. 1, server 145 represents not only a communications server, but other standard computer and/or server technology for managing private network 130, including monitoring and obtaining threat intelligence 190, and comprises memory (e.g., ROM and/or RAM), data storage (e.g., disk drive or solid state drive (SSD)), one or more computer processors for executing instructions from the memory, and/or an ASIC and/or other hardware components alone or in combination with programming instructions executable by the processor(s).

Fictitious ecosystem 100 comprises fictitious profiles which may be fictitious business profiles 135, 140 and/or fictitious personal profiles 155, 160 that may be standalone profiles or associated with a fictitious business profile 135, 140. Ecosystem 100 also comprises strategically (e.g., purposefully or tightly) coordinated supporting fictitious infrastructure information, such as fictitious information artifacts 165, fictitious supporting history 170, other fictitious profiles and information 175, correlating information 180 among this infrastructure (or these components) of the ecosystem, and software bots 185, 187. This supporting infrastructure portrays an in-depth apparent authenticity of the ecosystem to the adversary. This ecosystem causes or forces the adversary to incrementally focus more adversarial effort on determining whether any potential attack points of the ecosystem are authentic. In other words, the adversary must do a lot more detective work, and spend more resources upfront, to distinguish the fake profiles and information in the fictitious ecosystem 100 from any real profiles 115, 120, 125 on the public network 105. As a result, the adversary will spend less effort on attacking any potential real target 130, 150.

The disinformation in fictitious ecosystem 100 that is provided to an adversary may, in one example, utilize some legitimate (real) information to lend additional credence. For example, such legitimate information may include the name of a company that a high-value target works for, selected employee names, and selected business group names. This will be mixed with the fictitious information, e.g., names of companies and employees created only for the purpose of the disinformation campaign.

Depending on the need, the disinformation campaign may operate at different levels and work in different time frames. For instance, in one example an entirely fictitious virtual enterprise 135 or 140 may be generated along with social media profiles 155, 160 for CEOs and other high level executives. This campaign may also potentially be long lasting and may involve or reference many activities of a legitimate business 115. Any and all communication targeting these executives is then collected and analyzed to help identify other attacks by the adversary.

In another example, the ecosystem 100 may comprise a fictitious business partner organization 135 with a few fake employee profiles 155, 160. The partner profile 135 may mention the list of their customers on their site. If an attacker wants to target one of the customers (e.g., real business 115, or fake business 140), then the attacker may target the fictitious partner 135 first to exploit the trust relationship between the business partner organization and the customer to exploit a vulnerability inside the customer. This lure to the fictitious business partner organization 135 gives an advanced warning of the adversary's intentions and modus operandi with respect to protecting the real business.

In another example, fake employee profiles 155, 160 are created to appear to be inside or associated with a legitimate business 115. For example, profiles for employees that are commonly targeted by spear phishing may be generated, such as executives, administrative assistants to executives, and network administrators. Any communication targeting such fake employees is monitored, and threat intelligence is collected about the adversary. Such an approach helps identify attacks that are targeted toward the particular business.

In yet another example an entirely fictitious business profile 135 is created to appear to be inside or associated with a legitimate business 115, and any communication targeting such fictitious business profile 135 is monitored, and threat intelligence is collected about the adversary to identify attacks that are targeted toward the legitimate business.

This disinformation of the ecosystem 100 should be placed carefully and strategically so that an adversary is not alerted to such activities. It may be simple to create social media profiles 175, e.g., LinkedIn profiles, Facebook, Instagram, and Twitter accounts, for fake employees, whereas it may be more challenging to create fake executive profiles on a company's web site. In particular, it takes more time and effort to create fake executive profiles that will stand up to scrutiny by a skilled adversary. But with proper coordinated and strategic planning, careful placement of each piece of information will enable the monitoring organization to trace where an adversary found it.

Additionally, the ecosystem may allow some less damaging attack attempts to get into the target in order to generate a false sense of confidence for the adversary. For example, real or fake individuals may communicate with the adversary, while controlling the information the adversary gets, e.g., documents containing fake financial or customer information. Alternatively, bots 185, 187 may automatically interact with the adversary to give a false sense of reality and enable the capture of additional threat intelligence from the adversary.

In an example implementation, conventional cloud computing resources are leveraged to generate the components of fictitious ecosystem 100 quickly, cost-effectively, and in a systematic and repeatable manner. Also, creation of fake employee profiles 155, 160 and fake enterprises 135, 140 may be generated asynchronously and/or at different points in time to give more credence to the authenticity of the system. Moreover, all this infrastructure may be generated via scripts (or other similar process) executable on a processor in a computing environment, and the personas, partner businesses, etc., may be selected from a "menu" of existing entities from the asynchronous process.

Strategically coordinating together a convincing story of disinformation within the ecosystem to dupe adversaries is depicted by correlating element 180. This tightly coordinated ecosystem of fictitious information makes it more difficult for an adversary to compromise a high-value target, as all of the accounts and infrastructure set up as part of the decoy network are monitored 190 to gain threat intelligence from the adversary. Additionally, monitoring different activities related to the fake profiles to gather relevant threat intelligence increases the possibilities for recognizing and prohibiting attacks.

For example, the mailboxes of the fake employee profiles 155, 160 may be monitored to look for phishing campaign or spear phishing emails, or an instruction in an attack email may be followed, e.g., clicking on a malicious link (from a "clean" environment) to learn more about the adversary's hosting infrastructure. Although clicking on a link is an "active" technique, a more "passive" or indirect technique is also possible. For example, the hostname or IP address in the URL may be examined to determine who owns it without actually communicating with that host. If the host actually belongs to a non-adversarial organization (e.g., a partner, or other trusted external organization), then this threat intelligence could be shared with them to help stop the adversary at a location outside of the private network 130. This process keeps the adversary stuck or focused at the reconnaissance stage relative to private network 130. Additionally, authentication activities may also be monitored to detect attempts to compromise the fake employee's credentials. To summarize, the information gathered about the adversary forms threat intelligence for private network 130, and may also reveal information that can help protect others as well 115,

120, 125 (e.g., the adversary may have shared infrastructure supporting multiple phishing campaigns).

This fictitious ecosystem approach may be used to gather timely and personal threat intelligence for targets (including high-value targets) in an enterprise in order to detect and prevent malicious communications (attacks) such as phishing, spear phishing, and whaling. Such threat intelligence can potentially prevent devastating attacks on the enterprise and may also generate intelligence useful for several organizations in an industry vertical. Additionally, the ecosystem causes, or forces, adversaries to incrementally focus more adversarial effort on determining whether any potential attack points of the ecosystem are authentic. This takes the cyber security fight to the attackers at the initial stage of the "kill chain," rather than at later stages, to minimize potential damage to any organization being protected.

Figure 2:
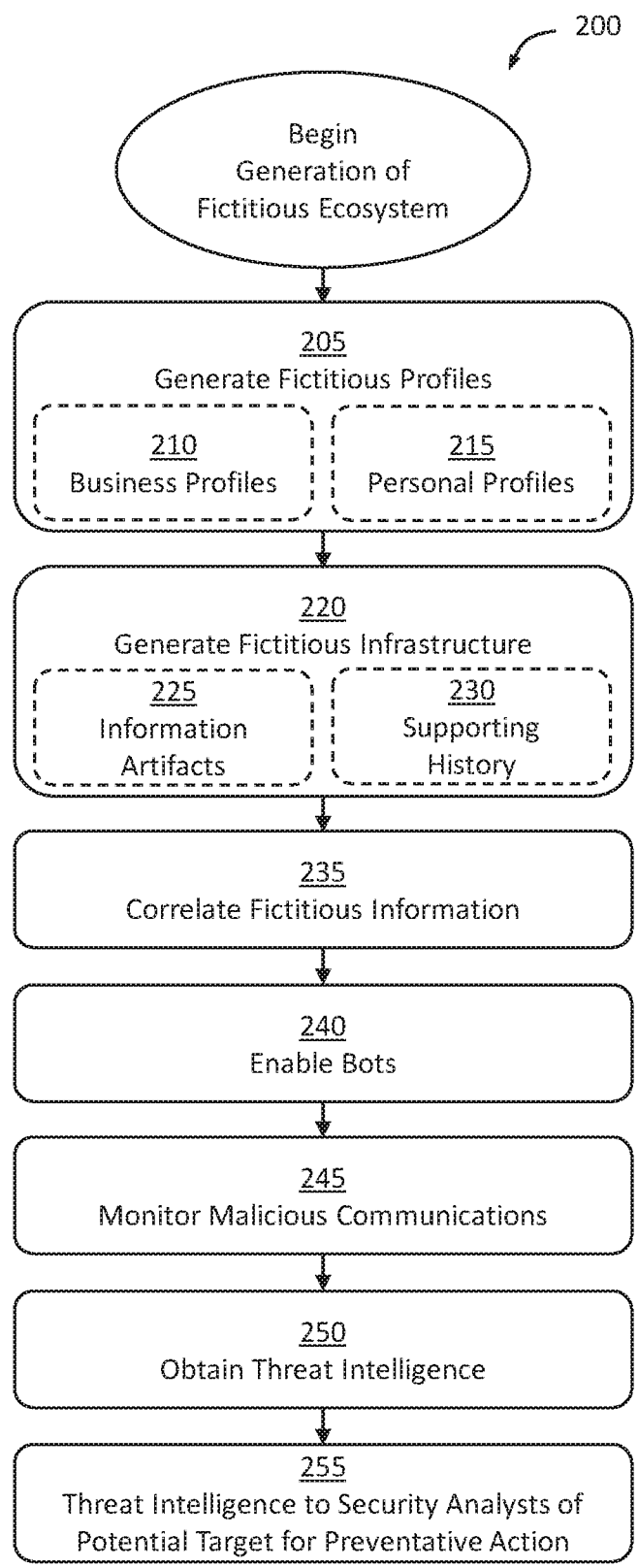
FIG. 2 is a flow chart illustrating an example method of implementing a strategically coordinated fictitious ecosystem of disinformation for managing cyber threats.

FIG. 2 is a flow chart illustrating an example method 200 of generating, implementing or structuring a fictitious ecosystem of disinformation 100 for managing cyber threats within a public computing network or environment 105 (e.g., the Internet or a cloud environment).

The system and/or operations of method 200 may be embodied in whole or in part as programming instructions stored on a non-transitory, machine-readable (e.g., computer/processor-readable) medium, such as a RAM or ROM memory for execution in a computing device or devices (e.g., network server 145), and/or a combination of programming instructions with human interaction. In some examples, implementing the operations of method 200 can be achieved by a processor reading and executing the programming instructions stored in the memory. In other examples, implementing the operations of method 200 can be achieved using an ASIC and/or other hardware components alone or in combination with programming instructions executable by a processor in a computing device or devices and/or any combination.

The example method 200 may include more than one implementation, and different implementations of method 200 may not employ every operation presented in the respective flow diagram of FIG. 2, or may employ additional steps not shown in FIG. 2. Therefore, while the operations of method 200 are presented in a particular order within the flow diagram, the order of their presentations is not intended to be a limitation as to the order in which the operations may actually be implemented, or as to whether all of the operations may be implemented. For example, one implementation of method 200 might be achieved through the performance of a number of initial operations, without performing one or more subsequent operations, while another implementation of method 200 might be achieved through the performance of all of the operations.

As we begin the generation, structuring or implementation of a fictitious ecosystem for managing cyber threats 200, a first step comprises generating fictitious profiles 205. Such profiles may be one or more business profiles 210, and/or personal profiles 215, or a combination thereof, that are representative of businesses, persons, or other entities. As commonly found on the Internet, the profiles present information or include data representing or concerning the respective business, person or other entity, or may include advertising or marketing for goods or services, or personal information pertaining to the identified individual.

For example, a fictitious business profile 210 may comprise web pages depicting the fictitious business entity, its existence, purpose, goods and/or services, marketing or advertising components, certain personnel or executive leadership information, and/or any other related information commonly found on business web pages. On the other hand, the business profiles may comprise common social media types of profiles and postings, coordinated through platforms such as LinkedIn, Instagram, Facebook, and Twitter. Personal profiles 215 may likewise comprise information relating to the individual identified by the profile, and may comprise web pages or be constructed using the aforementioned or other social media sites. These profiles are generated to seem as real as possible in order to lure malicious attacks and to ultimately obtain threat intelligence from an adversary.

A next step of method 200 comprises generating fictitious infrastructure information 220 to support the fictitious profiles 210, 215 and portray in-depth, apparent authenticity of the ecosystem 100. To clarify, the physical infrastructure to support fictitious profiles is real, functional and operational, but the infrastructure information lending credence and authenticity to the profiles is fictitious and distinct from private network 130 and infrastructure related to that. Such fictitious infrastructure information comprises generating one or more information artifacts 225 and supporting history 230 relevant to the fictitious profiles 210, 215. For example, information artifacts may comprise fictitious or real web pages, other social media profiles, and/or informational postings on blog sites, news sites, and the like, that reference, support, and lend credence to the apparent reality of the fictitious profiles 210, 215. Likewise, supporting history may comprise elements of information in other fictitious or real profiles or web content that support data posted on the fictitious profiles, such as a business or employer referencing dates or timelines that give credence to dates or timelines identified in a fictitious profile, or other real or fictitious events that occurred in the past, such as a natural disaster, sports event, or political event, that align with the alleged postings or statements of the fictitious profile.

Next, 235, the information and data in the fictitious profiles 205 and fictitious infrastructure information 220 is correlated, or cross-checked to ensure it all correlates accurately among all these different components of the fictitious ecosystem 100, to portray in-depth, apparent authenticity of the ecosystem. This comprises checking each profile, information artifact, and supporting history, to ensure they all make sense, are not contradictory, and appear believable and authentic. This correlation effort may occur during the development of the fictitious profiles 205 and infrastructure 220, and/or after some effort of development has occurred. The intent of correlating information and components of the ecosystem is to portray the ecosystem as real as possible, and to lure and entice the adversary to attempt a malicious attack on the fictitious business or personal profiles.

An optional step to lend additional apparent credence and authenticity to the ecosystem 100 is to enable and deploy software bots 240 to interact with malicious communications and to provide a perspective that the interaction is with real individuals. For example, if an adversary sends an email to one of the fictitious profiles, then the bot detects that communication and returns a relevant response, giving the adversary the perception that the profile is real and used by a real person. Additionally or alternatively the bot may interact in a text messaging, direct messaging, chat application, or other similar application that may be the source of the malicious communication. As another example, the bot may return fake attachments, documents, spreadsheets, etc., that have fake and/or some real information. Additional options for the bots 240 may include managing a fake voicemail box, or converting voice to text for responding to a received voicemail with a fake text message or email.

Information gleaned from the bots 240 may be used as information to prevent another attack.

Once the fictitious ecosystem 100 is generated and implemented, communications into the system are monitored 245 so that malicious attacks from an adversary are detected. This comprises, via a programmed processor(s), detecting communications to each profile, identifying where the communication may be malicious, and capturing information (e.g., threat intelligence) about the adversary that sent the communication. In this context, separating out acceptable communications or spam from more malicious communications is not always cut and dry, but some tactics to consider may include, for example, leveraging threat intelligence gathered from previous communication attempts (e.g., commonalities in the URL structure, ISP used), misspellings in an email, improper grammar, uncommon or varied URL addresses relative to normal spellings, suspicious web links embedded in an email, direct message or instant message activity, an Internet service provider (ISP) from an odd location, and requests for personal information, or combinations of these.

During the monitoring activity and/or after monitoring the communications in the ecosystem, threat intelligence collected about the adversary is obtained 250 from the monitored activities. This may comprise identification of at least one of a phishing campaign, spear phishing email address, domain, mail server, malicious link, web server hosting the malicious link, adversary infrastructure, IP address, organization name, Internet service provider in odd location, adversary attack history, URL, adversary contacting from a different location from where redirecting, email aspects, messenger information, what weakness in the ecosystem the adversary is attacking, different tactics, techniques, and procedures (TTP) being used by the adversary, or combinations thereof. Additionally, the threat intelligence may be used to dynamically change characteristics of some of the fictitious profiles 135, 140, 155, 160, or to generate another fictitious profile 175, to make such more vulnerable to the malicious attacks for collecting even additional threat intelligence.

Finally, 255, the threat intelligence may be provided to security analysts associated with a potential real target or network to take appropriate preventive actions against the adversary. For example, referencing FIG. 1 again, a private network 130 may configure its enterprise communications server 145 to block, via gateway 195, any malicious communications (e.g., email, messaging, chat, VOIP) from the adversary's communications server associated with the malicious attack 110 that is addressed to a CxO or other executives or employees private personal data 150 of the private network 130, and may configure the enterprise's web proxy server to block HTTP requests to the adversary's web server associated with the malicious attack 110. As another example, in some circumstances all network communications via any application protocol could be selectively blocked. This protects not only the private personal data 150, but also the private business data 190 of private network 130.

Figure 3:
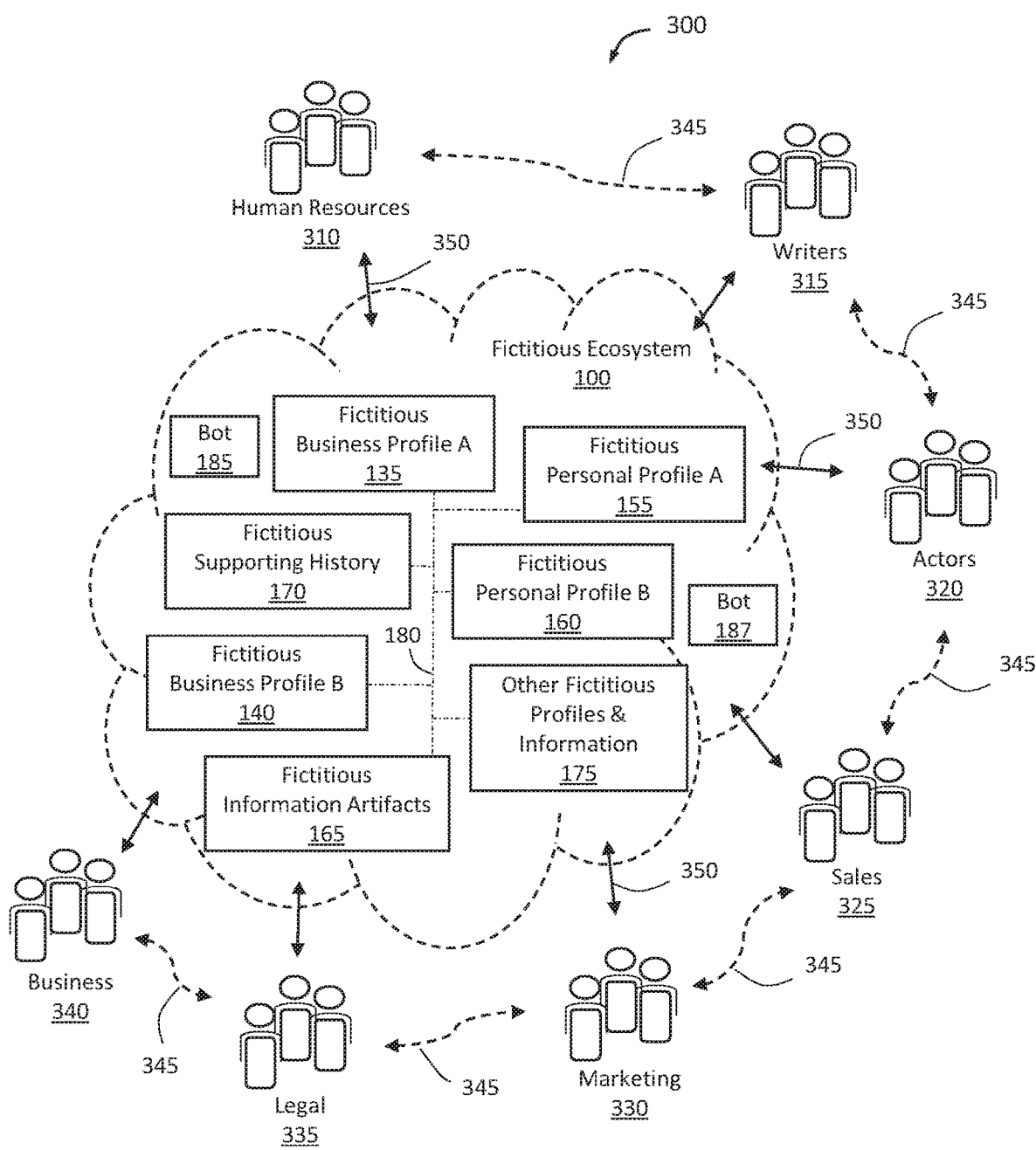
FIG. 3 is a block diagram illustrating an example method of generating a fictitious ecosystem leveraging real business organization human resource talent.

FIG. 3 is a block diagram 300 illustrating an example method of strategically generating or structuring a fictitious ecosystem 100 by leveraging real business organization human resource talent to ensure a comprehensive and correlated system. Business organization human resource talent may comprise at least one of a human resource personnel 310 (e.g., a hiring manager or recruiter), writer 315 (e.g., author of fiction or screenplay), actor 320, sales person 325, marketing person 330, legal person 335, business developer 340, or other relevant personnel or experts, or combinations thereof. Such individuals, groups, or business personnel coordinate among each other 345 to develop and ensure consistency and accuracy, and to create, weave, and correlate 180 plausible stories, profiles, histories, and supporting information to establish apparent authenticity among components of the ecosystem 100 and to implement 350 such components into and within the ecosystem.

Figure 4:
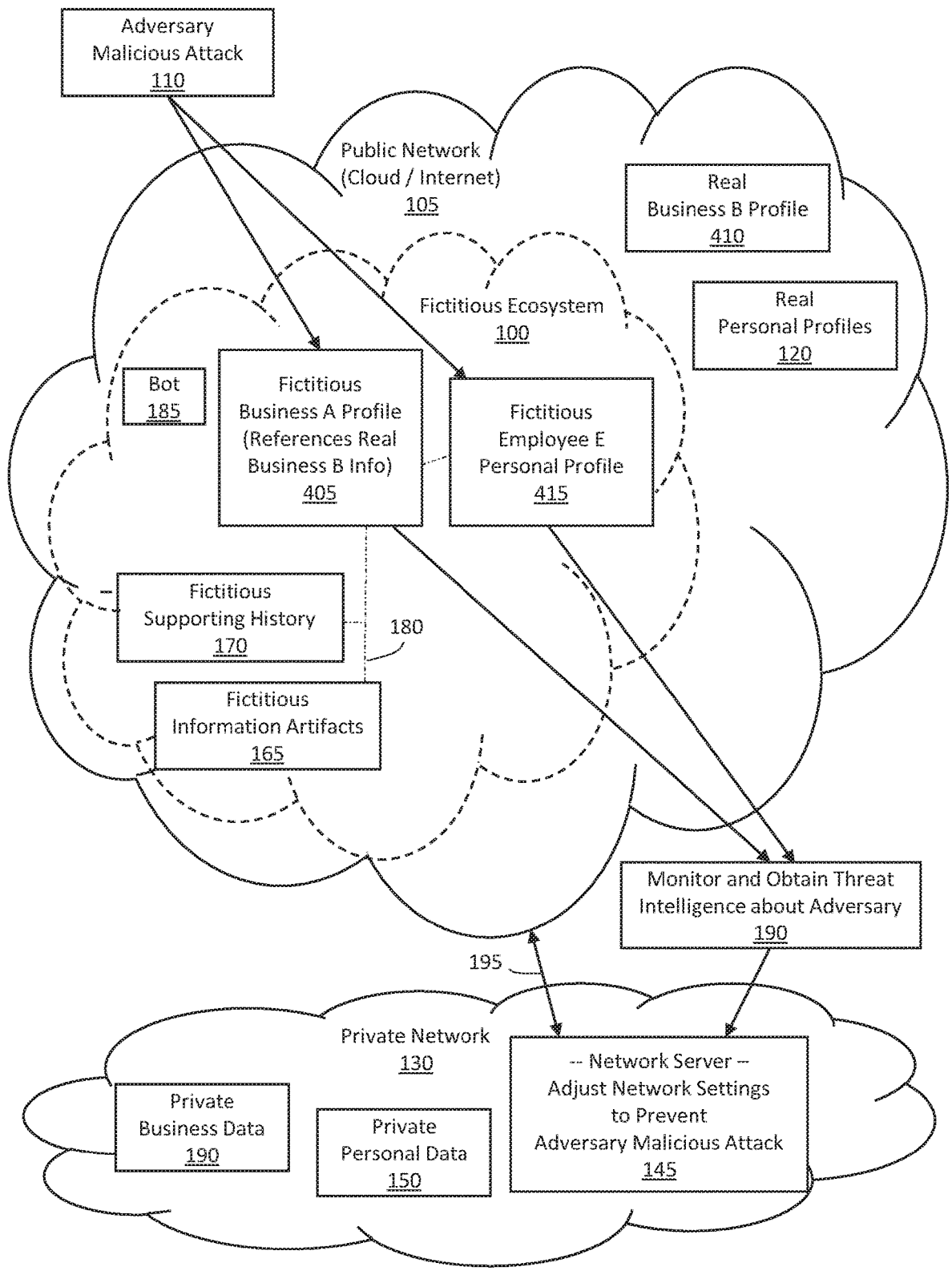
FIG. 4 is a block diagram illustrating an exemplary fictitious ecosystem of disinformation employing a fake profile that references real business information to dupe an adversary.

FIG. 4 is a block diagram illustrating an example disinformation system and method in the fictitious ecosystem 100 that employs within a fictitious profile a reference to real business information of a business that does business with an entity (e.g., fake business or person) associated with the fictitious profile. FIG. 4 reflects only some of the original components of FIG. 1 to simplify the diagram with respect to the focus of this example. In this example, fictitious business organization A profile 405 exists in fictitious ecosystem 100, and references, advertises or discloses that a real business, depicted by real business B profile 410, is a customer or business partner or otherwise does business with fictitious business A. Fictitious business A associates some real information in its profile 405 about real business B. Fictitious business A may also reference in its profile 405 that employee E is an employee of business A, represented in the diagram by fictitious employee E personal profile 415.

This scenario lures an adversary's malicious attacks or communications 110 to fictitious business A profile 405 or fictitious employee E profile 415 because the adversary may recognize real business B as a well-known or high-value business in the industry. So the adversary attempts to obtain confidential information about real business B by way of malicious communications with fictitious business A or fictitious employee E. The attacker may target the fictitious business 405 or employee 415 first to exploit the trust relationship between the business A 405 or employee 415 and the real business customer 410 to exploit a vulnerability inside the customer. Malicious communications addressed to fictitious business A and fictitious employee E are monitored 190 especially with respect to attempts referencing real business B 410. This provides threat intelligence with respect to possible attacks against real business B, and real business B may consequently adjust its network settings 145 to prevent such an attack on its private network 130.

While this disclosure has been described with respect to example embodiments outlined above, it is evident that alternatives, modifications and variations will be apparent to those skilled in the art. Accordingly, the described and depicted examples of the present disclosure are intended to be illustrative, not limiting, and the subject of the appended claims is not necessarily limited to the specific features or methods described herein.

What is claimed is:

1. A method of effectuating a disinformation campaign for collecting malicious communications in a computing network, comprising:
   generating a strategically coordinated ecosystem of fictitious information in the computing network, the strategically coordinated ecosystem comprising fictitious profiles and supporting fictitious infrastructure information to portray in-depth, apparent authenticity of the strategically coordinated ecosystem;
   monitoring malicious communications directed at the strategically coordinated ecosystem; and
   obtaining threat intelligence about an adversary responsive to monitoring the malicious communications,
   wherein the threat intelligence is used to dynamically change characteristics of the fictitious profiles.

2. The method of claim 1 wherein the fictitious profiles comprise at least one of a fictitious business organization profile, a fictitious employee profile, or combinations thereof.

3. The method of claim 1 wherein the fictitious infrastructure information comprises at least one of information artifacts, supporting history, correlating information among components of the strategically coordinated ecosystem, or combinations thereof.

4. The method of claim 1 further comprising enabling bots in the strategically coordinated ecosystem to interact with the malicious communications and to provide a perspective that the interaction is with real individuals to portray the in-depth, apparent authenticity of the strategically coordinated ecosystem.

5. The method of claim 4 wherein the bots interact with the malicious communications comprising at least one of responding to an email, responding to a text message, responding to a direct message, responding to a chat communication, managing a voicemail box, converting voicemail to a text response, converting voicemail to an email response, returning fake documents, or combinations thereof.

6. The method of claim 1 wherein the threat intelligence comprises identification of at least one of a phishing campaign, spear phishing email address, domain, mail server, malicious link, web server hosting the malicious link, adversary infrastructure, IP address, organization name, Internet service provider in odd location, adversary attack history, URL, adversary contacting from a different location from where redirecting, email aspects, messenger information, what weakness in the strategically coordinated ecosystem an adversary is attacking, different tactics, techniques, and procedures being used by an adversary, voicemail, text messaging, or combinations thereof.

7. The method of claim 1 wherein generating the strategically coordinated ecosystem comprises receiving input from non-cyber security personnel to develop the in-depth, apparent authenticity of the strategically coordinated ecosystem.

8. The method of claim 7 wherein the non-cyber security personnel comprises at least one of a human resource personnel, writer, actor, sales person, marketing person, legal person, business developer, or combinations thereof.

9. The method of claim 1 further comprising:
disclosing, within at least one fictitious profile, real information associated with a real business to portray that the real business does business with an entity associated with the fictitious profile; and
identifying, via the threat intelligence, an effort by the malicious communications to obtain information from the entity associated with the fictitious profile concerning the real business.

10. The method of claim 1 further comprising analyzing the threat intelligence to recognize malicious attacks on real targets.

11. The method of claim 1 further comprising providing the threat intelligence to a potential real target of the malicious communications for preventive action against such malicious communications.

12. A system for effectuating a disinformation campaign for managing malicious communications in a computing network, comprising:
a strategically coordinated ecosystem of fictitious information in the computing network, the strategically coordinated ecosystem comprising fictitious profiles and supporting fictitious infrastructure information to portray in-depth, apparent authenticity of the strategically coordinated ecosystem; and
a processor programmed for instructions to monitor malicious communications from a party directed at the strategically coordinated ecosystem and to obtain threat intelligence about the party responsive to the monitored malicious communications,
wherein the threat intelligence is used to dynamically change characteristics of the fictitious profiles.

13. The system of claim 12 wherein the fictitious profiles comprise at least one of a fictitious business organization profile, a fictitious employee profile, or combinations thereof.

14. The system of claim 12 wherein the fictitious infrastructure information comprises at least one of information artifacts, supporting history, correlating information among components of the strategically coordinated ecosystem, or combinations thereof.

15. The system of claim 12 further comprising bots in the strategically coordinated ecosystem configured to interact with the malicious communications and to provide a perspective that the interaction is with real individuals to portray the in-depth, apparent authenticity of the strategically coordinated ecosystem.

16. The system of claim 15 wherein the bots are configured to interact with the malicious communications comprising at least one of responding to an email, responding to a text message, responding to a direct message, responding to a chat communication, managing a voicemail box, converting voicemail to a text response, converting voicemail to an email response, returning fake documents, or combinations thereof.

17. The system of claim 12 wherein the threat intelligence comprises identification of at least one of a phishing campaign, spear phishing email address, domain, mail server, malicious link, web server hosting the malicious link, adversary infrastructure, IP address, organization name, Internet service provider in odd location, adversary attack history, URL, adversary contacting from a different location from where redirecting, email aspects, messenger information, what weakness in the strategically coordinated ecosystem an adversary is attacking, different tactics, techniques, and procedures being used by an adversary, voicemail, text messaging, or combinations thereof.

18. The system of claim 12 wherein the strategically coordinated ecosystem is structured based on input received from non-cyber security personnel to develop the in-depth, apparent authenticity of the strategically coordinated ecosystem.

19. The system of claim 12 wherein at least one fictitious profile discloses real information associated with a real business to portray that the real business does business with an entity associated with the fictitious profile, and the processor is further configured to identify via the threat intelligence an effort by an adversary to obtain information from the entity associated with the fictitious profile concerning the real business.

20. A non-transitory machine-readable storage medium storing instructions that when executed by at least one processor cause the processor to:
monitor malicious communications from a party directed at a strategically coordinated ecosystem of fictitious information in a computing network, the strategically coordinated ecosystem structured to effectuate a disinformation campaign for malicious communications in the strategically coordinated ecosystem, wherein the strategically coordinated ecosystem comprises fictitious profiles and supporting fictitious infrastructure information to portray in-depth, apparent authenticity of the strategically coordinated ecosystem; and,
obtain threat intelligence about the party responsive to the monitored malicious communications,
wherein the threat intelligence is used to dynamically change characteristics of the fictitious profiles.

* * * * *